A. THOMA.
PLASTIC SHEET COMPOSITION.
APPLICATION FILED NOV. 14, 1906.
957,394.
Patented May 10, 1910.
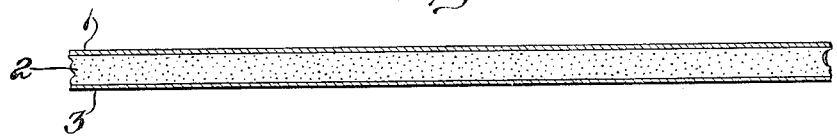
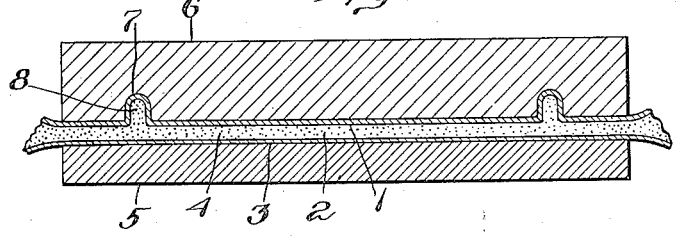
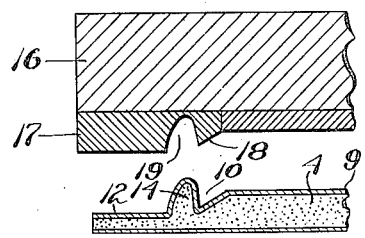
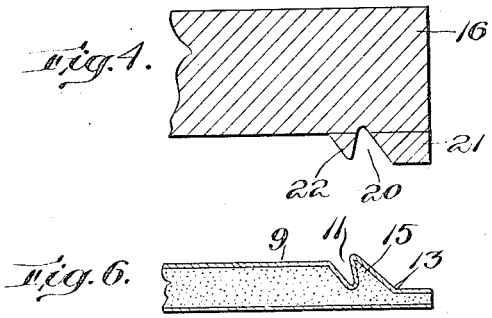
Witnesses:
Arthur F. Randall
Edward Maxwell.
Inventor:
Andrew Thoma,
by Geo. S. Maxwell,
Attorney.

UNITED STATES PATENT OFFICE.

ANDREW THOMA, OF CAMBRIDGE, MASSACHUSETTS, ASSIGNOR TO THOMA CORPORATION, OF PORTLAND, MAINE.

PLASTIC SHEET COMPOSITION.

957,394.  Specification of Letters Patent.  Patented May 10, 1910.

Application filed November 14, 1906. Serial No. 343,317.

*To all whom it may concern:*

Be it known that I, ANDREW THOMA, a citizen of the United States, residing at Cambridge, in the county of Middlesex and State of Massachusetts, have invented an Improvement in Plastic Sheet Composition, of which the following description, in connection with the accompanying drawings, is a specification, like numerals on the drawings representing like parts.

For various purposes—e. g. in shoes, carriage-leathers, harness, furniture, etc.—it is desirable to have a light, porous, waterproof, pliable, tough sheet-material which shall be inexpensive and capable of being worked into desired form for articles of manufacture. For example in manufacturing shoes, even the finest grades of shoes, there are certain parts and processes in which the material at present employed is expensive, much delay, labor and expense are requisite in handling the material, and even then the results are not satisfactory. This applies particularly for instance to innersoles, and, accordingly, without intending to limit my invention thereto (excepting as to certain of the more restricted claims contained at the end of this specification), I will hereinafter refer particularly by way of illustration to innersoles, and will explain my invention in the various details from the manufacture of the original special material and the various steps of its use to said final finished article.

I provide a tough, pliable, flexible sheet of composition, which I mold or conform locally, so as to provide, for instance, a stitch-receiving rib, by applying a female mold to one side and a plane pressure plate to the opposite side of the sheet, and then, while leaving the main body of the sheet intact and undisturbed, pressing said mold and plate toward each other until the cavity of the mold is occupied by a relief portion, but without disturbing the integrity of the sheet or its internal structure and strength.

While my invention is capable of many variations, preferably I depend upon vulcanizing a pulp and upon the further new principle of introducing into the mass an ingredient which permits the vulcanized mass to relent or respond under heat sufficiently to assume under compression the desired form without losing any of its required properties above mentioned. In other words, I first compound the mass with the requisite ingredients for providing the desired porous, light, tough, pliable, waterproof qualities in the resultant material, the ingredients of said mass including means for producing a soft or partial vulcanization, and for permitting the semi-vulcanized material to relent sufficiently to be compressed into innersoles or the like, and to receive the local molded configuration required for forming the stitch receiving lip or other local configuration according to whatever article is being formed, and for recovering, upon quickly cooling or setting, the original vulcanized condition. Then I calender, sheet and vulcanize the material. I then block it out, soften it, supersoftening one surface thereof, mold it in a novel manner with simply a female die, no complemental male die member being used, this step also condensing the porous material, and cool it, thereby permanently setting the shape and character of the finished article.

The accompanying drawings illustrate portions of my process and the finished article, the article being claimed in this patent, and the process in a divisional case, Serial No. 352,162.

Figure 1 is a fragmentary cross-sectional view of the sheet fabric in one of its preferred forms; Fig. 2 is a transverse sectional view illustrating the manner of molding or forming a configuration on said fabric; Figs. 3 and 4 are cross-sectional views of different forms of molds; and Figs. 5 and 6 are cross-sectional views of the products shaped by the molds of Figs. 3 and 4 respectively.

My object is to provide sheet material of great pliability and adaptability, which shall at the same time be incapable of stretching lengthwise or widthwise and shall have a surface tenacity and toughness capable of holding and retaining stitches under great strain, as in a shoe or in any other articles previously mentioned, and shall be absolutely waterproof, unchangeable, and comparatively light, cheaper than leather, and shall cost much less than leather to manipulate and make into the finished product.

Although my invention may be carried out and embodied in a wide variety of steps and products, I deem my preferred method and product so superior to the others that, for convenience of presentation and clearness of understanding, I will at once describe the invention from that standpoint.

The fabric which constitutes the basis of my invention is preferably composed of a layer of heavy, strong textile material, such as 10 to 15-ounce duck or canvas, as an outside skin or layer 1 and a back or body 2 of special vulcanizable or heat influenced compound, and preferably a third layer or outside skin 3 of finer, lighter textile material, such as 8-ounce sock-lining canvas. The composition and the canvas, whether the latter is on one side only or on both sides, are calendered and pressed together until thoroughly incorporated into each other, the ingredients of the composition being such that the material not only is firmly pressed into the meshes of the cotton fabric, but penetrates into the fabric, and which, under the heating or vulcanizing produces the light, porous, durable, pliable, tough, waterproof, etc., qualities required. Also it is desirable to previously friction the cloth as hereinafter described.

Various attempts have been made to combine layers of canvas with rubber and gutta-percha compounds interposed in the form of a sheet or tissue between two layers of canvas or in other plastic form, but as prepared and proposed these differ entirely from my invention, as they not only deteriorate in use, and the rubber is heating or " drawing," but they are used mainly as a mere cement or plastic binder, and are incapable of effecting the homogeneous or unitary body and article which it is my aim to produce. Also, when rubber is vulcanized it is incapable of being molded and shaped or pressed and otherwise treated, as required of my product.

The intermediary layer of vulcanizable composition is composed of paper pulp or stock, wood pulp, fibrous waste, shoddy, or junk, residuum of petroleum, wax tailings, litharge, sulfur and palm oil. A material of this nature may be massed in large quantities and rolled and sheeted upon a fabric layer of any desired length and calendered as explained, and especially when faced by two layers of strong fabric and subjected to both pressure and heat sufficient to flux and to semi-vulcanize the mass as a whole the union of the three layers and the change wrought by the heating process are such as to produce a sheet fabric of sufficient thickness and strength for the purpose explained and admirably adapted to the special molding process for forming innersoles and the like as hereinafter explained.

I wish it understood that the ingredients of my compound can be selected from a great number of materials, but to make the invention clearly understood I will classify the ingredients, such classification indicating also the reasons of their use and selection. The body materials for the intermediate filling may be paper pulp and various kinds of paper stocks, ground leather or leather dust, waste products of the manufacture of starch or the like, waste shoddy products of any fibrous material, the fibrous portions of such scrap as junk dealers collect for rubber houses, commonly called " old rubber waste," capable of being ground and massed. Instead of pure body materials or filler materials, as above, I may employ materials which will serve the purpose of the filler or body and likewise to some extent of the binder, such as the shoddies of reclaimed rubber (devulcanized rubber), semi-vulcanized or unvulcanized factory scrap, waste rubber, coagulated or sulfureted or oxidized oils, and many of the so-called rubber substitutes. The vulcanizing ingredients and mineral filler which may be employed are sulfur, litharge, white lead, whiting, and ground slate. And the mineral binding agents used are wax tailings, petroleum residuum, hydro-carbon, such as kapak, mineral rubber, gilsonite, etc., animal tar such as stearin pitch, coal tar, soft or hard. Under this head of mineral binding agents it is possible to use, but with inferior results, asphalts such as Trinidad, Egyptian, Manjack or the like, which are effective in binding the mass but are too adhesive to facilitate properly the milling or mixing and sheeting, presently described, as they adhere to the rolls and interfere with the quick mixing and delivering of the stock.

I select from the enumerated ingredients sufficient quantities of the filler material, binding and vulcanizing agents to be able to mass and sheet the stock onto the fabric layer. A great variety of selections is possible from the ingredients mentioned, as will be readily understood by those skilled in the art, and accordingly I will mention a sample formula by way of illustration. Of bulk-giving or filler ingredients I use 3 pounds wood-pulp, 3 pounds leather dust, 12 pounds of junk (rubber scrap stock), and $\frac{1}{2}$ pound of jute or cotton shoddy, and of mineral filler 7 pounds of whiting. To the foregoing I add $3\frac{1}{2}$ pounds of litharge and $1\frac{1}{4}$ pounds of sulfur as the vulcanizing agents, and 5 pounds of tough hydro-carbon (i. e., the products sold in the market under the trade name of " hydro-carbon "), such as kapak, mineral rubber, gilsonite, etc., as previously mentioned, 3 pounds of petroleum " residuum " (so-called in the trade), and $3\frac{1}{2}$ pounds of hard wax tailings as the mineral binding agents, and 2 pounds of palm oil as a slicking agent (for preventing the composition sticking to the calendering rolls). The amount of sulfur as above stated, produces at 265 degrees Fahrenheit a soft cure in about forty-five minutes, so that when the material has set and cooled it will be found to be flexible, strong and firm. The mineral tarry substances act as a binder, becoming soft during the mixing of the ingredients and helping toward the sheeting of the mass. They penetrate and absorb the dry, fibrous and mineral ingredients and materially assist in the vulcanizing process. The melting point of all but the wax tailings is near the vulcanizing point, so that the vulcanizing action is not impeded by any part of the mass, but on the contrary the compound is such that a soft vulcanization of the pulp-like mass can take place at the comparatively low temperature of about 265 degrees, which will not injure the cloth and yet will produce a backing or intermediate filling of vulcanized pulp vulcanized to the textile material. This is secured by applying a female mold to one side and a plane pressure plate to the opposite side of the composite sheet, and then, while leaving the main body of the sheet intact and undisturbed, pressing said mold and plate toward each other until the cavity of the mold is occupied by a raised or relief portion, but without disturbing the integrity of the sheet or its internal structure and strength. The mass is first compounded with the requisite ingredients for providing the desired porous, light, tough, pliable, waterproof qualities in the resultant material, said ingredients including means for producing a soft vulcanization and for permitting the vulcanized material to relent sufficiently to be compressed into innersoles or the like and to receive the local molded configuration, and for recovering, upon quickly cooling or setting, the original vulcanized condition.

Having prepared and thoroughly mixed the mass of body-giving materials, as above explained, I calender and sheet the same by the calendering method and means at present commonly employed in rubber factories for treating rubber compounds. This is the most convenient means to bring about the spreading of the thick layer of my composition between the two outside fabric coatings or layers. It is desirable, in order to make the union between the compound and the textile or outer skin as perfect and complete as possible, to first friction the cloth, i. e., it is mechanically impregnated and filled with a compound similar to the compound 2 (omitting the palm oil), only somewhat dryer. The mixture is first sheeted out under great pressure upon the heavy 15-ounce duck, being thereby incorporated and embedded firmly into the meshes of the coarse cotton fabric. Then, if an opposite textile layer is to be employed, the thin, light, finer canvas is calendered and pressed upon the top of this thick sheeted mass previously calendered and pressed, so that the three layers are practically incorporated together as a whole. Next the united or composite sheet thus formed is wound tightly in lengths of 25 to 50 yards on large iron drums and placed in large vulcanizing boilers, as used by the trade, or shorter lengths, according to the size of the press, are pressed between heated steam plates in a usual vulcanizing steam press and are heated as already explained. One of the distinguishing features of my invention will be apparent in the vulcanizing process, as my ingredients or compound, when under the vulcanizing influence, fluxes at a comparatively low temperature as above mentioned, and sets so as to form a firm, flexible, porous material, protected by the outer layers of strong fabric, the length of time varying according to the selection of the ingredients, the degree of heat employed and the method of curing. The latter may be by a wet heat or by a pressure heat, the wet heat process of curing under atmospheric pressure being always applied when the material is firmly secured and wound tightly as above explained, and giving the best results with the preferred compounds. The kind of vulcanizing process and the length of time, etc., are selected according to the necessity for economy, etc.

The wax tailings produce a strong permeating quality and help to soften the dry, fibrous filling material, so that the action of the sulfur and the drying influence of the litharge and fluxing and setting of the whole mass take place during the vulcanizing heating; and the hydro-carbon constituents also permit of the subsequent softening of the vulcanized mass or sheet for the molding process without injury to the mass and quality and without destroying or changing any of the desirable qualities which have been secured. When cold and set after heating or semi-vulcanization the sheet is firm and strongly flexible, somewhat like leather, but is capable of softening at once under strong heat, so as to conform readily, quickly and permanently to the desired molded shape. It is this capacity, together with the light, porous nature of the material, which is of the greatest importance in my invention and which it has been my main object to secure. These features together with the fact that the material is tough, always pliable and workable, and waterproof, adapt the material admirably to the field of use already mentioned, and particularly to the manufacture of innersoles.

The proportion of vulcanizing material and the heat applied, taken in connection with the ingredients composing my compound, are such that the product will be neither flabby nor hard, but will be firm and strong and flexible, as I have said, by which I mean that it is as near as possible like firm, grain leather, such as is commonly used for the best kinds of innersoles, in its toughness, pliability and yielding nature.

As already explained, the wax tailings become highly fluid below the vulcanizing temperature, and being of an extremely penetrating nature, they flux and immediately penetrate, work through and permeate the entire mass. All the other tarry ingredients under the influence of heat (at or about 265 degrees F.) become plastic more or less, but they are not of a sufficiently penetrating nature to accomplish desirable results without the lower melting, highly fluid and penetrating element which is provided by wax tailings or an equivalent soft residuum (such as are sometimes called oxidized petroleum residuums). I accomplish the vulcanizing of the entire mass preferably between 265 and 275 degrees F.

In the formula above presented any of the tough so-called hydro-carbons such as kapak can be used, and any of the hard and more or less brittle so-called residuums, and either the soft or hard wax tailings (if the soft are used a slightly less amount would be employed). The low melting penetrating ingredient employed, whether wax tailings or other soft or semi-hard, low melting, penetrating, readily fluxing petroleum residuum product or coagulated oil, accomplishes the fluxing of all the ingredients and brings about a homogeneous vulcanized mass, while the presence of the hydro-carbons in general or sulfureted oils makes the sheeted material impressionable and permanently moldable whenever exposed to a high heat (between 240 and 270 degrees F.) without destroying the structural strength of the material. Rubber and rubber compounds when vulcanized cannot be softened or melted without first destroying their structural nature and in doing so they require a still higher degree of heat, which would be ruinous to the enveloping cotton element of my combination. Also not only do I secure the moldable capability by my compound and process, but I obtain a material which is normally entirely stable and is non-responsive to any ordinary heat to which a leather article would ever be subjected, so that when made into an innersole, for instance, it will not be influenced in the least by the heat of the foot. In speaking of my material being influenced by heat I refer to strong heat of about 240 to 265 degrees Fahrenheit.

Having prepared the sheet material, I block it out in pieces of the requisite length and width to be cut without unnecessary waste into soles for instance, by way of concrete illustration. These pieces are then laid with the heavy cotton fabric downward upon steam heated plates maintained at about 265 degrees F. so as to apply the strongest heat to that side of the material which is to be influenced. The material quickly softens and swells, especially on the heavy fabric side, although remaining absolutely intact and unaffected otherwise. The heated piece, indicated at 4 in the drawings, is then removed from the heating plate and is preferably placed heated side up on a convenient press plate 5 whereupon the shaping mold is immediately brought forcibly down onto the softened or influenced side 1 of the piece.

The mold will have the special configuration which it is desired the finished product to have. In the illustrations I have shown molds adapted to form the material into innersoles, Fig. 2 showing a mold 6 having grooves 7 for shaping the material to form a usual stitch-receiving rib or lip 8. It will be understood that various shaped channel grooves and projecting ribs or lips may be formed with facility in the material simply by providing the mold of the required shape. These may or may not be for the purpose of receiving actual stitches, but I use this term to cover a raised or molded rib on the tough, non-stretchable surface capable of receiving holding means of the kind required for the given place or position where the article is to be used or secured, as in harness manufacture, carriage or automobile work, shoe manufacture or whatever it may be. The mold 6 is brought down with a sufficient pressure to force the softened vulcanized material to change position, whereupon the partly yielding mass presses itself up into the groove rather than flattening out to any great extent in all directions, as might be expected would be the case. My process does not require any male member for making the lip 8 as the vulcanized mass 2 has sufficient stability and integrity of structure, aided by its penetrating and interlocking grip of the fabric, to compel the main body or mass of the sheet to remain substantially unchanged, yielding toward the point of no resistance 7 only just sufficient to fill the groove 7 without injury to the vulcanized structure of the material. The composition simply permits the softened top surface to yield at and toward the groove 7 so as to fill the groove and produce the desired local configuration, which in the instance illustrated is a stitch-receiving lip. The bottom fabric 3 aids in holding the lower portions of the sheet against movement and coöperates with the flat presser plate in converging the pressure to the point 7 of least resistance.

I prefer to employ cold molds moved quickly under heavy pressure, so that the material is hardened and sets at once, leaving, when the mold is withdrawn, a perfectly formed channel ridge or stitch-receiving lip or other local configuration in relief on the surface of the sole or piece 4, according to the shape or kind of mold used and leaving the textile layer 1 stretched and held by the composition layer in a permanent state of tension, so that the opposite ribs cannot shift or separate, as no subsequent yielding or stretching of the intervening taut area of the fabric can take place, when called upon later to withstand the strain of the shoe. The impression device or mold 6 when used cold is conveniently used close to suitable steam plates or other heating means for suitably softening the blocked out pieces of the material on that side which is to be impressed. The pressure is applied for a very short time only and the cooling takes place during the compression, so that when the mold is removed the article retains permanently and without change its molded shape. It is convenient to have two press compartments, thereby regulating the time of pressure of one press to the length of time required for emptying and refilling the other press, and so alternating from one to the other. More expeditious results, and in some respects better results, may be obtained by confining the pressure to a smaller region, as shown in Figs. 5 and 6, where it will be seen that the middle portion 9 of the piece 4 did not receive any considerable pressure, but the main pressure was applied simply along the V-shaped grooves 10 and 11 and at the outside margins 12, 13. By this means the stitch-receiving ribs 14 and 15 may be formed with still greater speed than when the pressure is distributed evenly over the entire surface as in Fig. 2. This also produces better results in not disturbing the greater portion of the duck and body material. All the ingredients selected for the body portion of the sheet material render the latter sufficiently economical to enable me to have a fairly thick body from which to press the innersole or other article, and accordingly the innersole may be left with a full center or inner portion 9, thereby requiring no so-called bottom filler for leveling up the shoe after the innersole, upper and welt have been stitched together to receive the outer sole. For this reason also I prefer to provide the innersole with the shape of stitch-receiving lip shown in Figs. 5 and 6, and preferably the latter, as thereby, after the sewing of the upper and welt in place, the thin projecting end of the rib 15 or the blunter end of the rib 14 may be rolled down to a perfect level with the central bottom portion 9 filling the groove 11 or 10 and covering in the stitch completely, this leveling down being accomplished by a pressure roll. A shoe bottom constructed in this manner will hold its shape better than when built in the old way, as the foot has an even foundation to rest upon and the outer sole is in actual contact with the inner sole itself. I do not limit myself however to any particular shape of channel or rib, as it will be readily seen that my invention permits of a wide variety in this respect.

The mold for accomplishing the above results may be made in any desired manner, but preferably the body portion is constructed of wood, as indicated at 16, and the desired lip and groove configuration may be brought about by a narrow strip of metal 17 being secured in proper position on the face of the wood, having a sharp projecting part 18 and a groove 19, or the wood itself may simply be cut to the desired shape as indicated in Fig. 4, where the groove 20 is cut down into the block leaving a peripheral ledge 21 and pointed projecting part 22. These forms of molds provide not only an easy construction of the mold itself, but quick withdrawal of the mold from the pressed sole, and also produce an innersole channel which facilitates the free action of the needle and awl during the sewing operation. The periphery of the mold is the same in size and shape as the pattern used on the rounding machine for rounding the innersole, so that all the surplus material beyond the mold, see Fig. 2, is subsequently trimmed off, and also the mold itself is used as the pattern in the rounding machine. The mold also contains size and style marks and other designations, which are thereby at once indelibly impressed upon the face of the innersole, as the latter is molded; and then the pattern-mold and its cooled innersole are immediately rounded out, and the sole then removed, whereupon the mold is ready to produce another impression. While this could all be accomplished at the factory where the sheet material is made, I regard it as one of the advantages of my invention that the sheet material, blocked out, can if preferred be sold to the shoe manufacturers ready for them individually to mold, etc., according to the special system or other peculiarities of their respective factories. All the difficult work is done first, leaving only the simple and inexpensive work for the shoe factories.

I have already emphasized the fact that my sheet material is absolutely waterproof, even the canvas outer layer of the material being impregnated with the binding ingredients of the composition, the cotton fabric readily and completely absorbing during the heat vulcanization under pressure the fluxing portions of the compound to practically the same extent as the filler parts of the compound are impregnated and incorporated with said fluxing and binding ingredients. By this means I am enabled to entirely eliminate the well-known moisture absorbing feature of the leather between the sole and the foot, in shoe manufacture, and yet do not introduce any objectionable heating or drawing tendency, as my material although possessing certain of the general characteristics of rubber products is more like a pulp compound, not being heavy and dense like rubber but light and porous. The composition of my filling ingredients gives an internal granular or light-fibrous structure which provides a proper condition in the center of the mass, which helps to lighten the material so that it still further resembles leather. This spongy structure of the material is also of advantage in aiding to bring about what I consider one of the most strikingly novel and fundamental characteristics of my invention, namely the capacity of the vulcanized mass to be pressed into permanently local shape without destroying its structure. Also the capacity of the heated semi-vulcanized sheet to receive and retain any fixed shape or impress while the sheet is cooling is not only of importance as to the finished product but is of practical importance and value in facilitating the speed, ease and accuracy of the work, and this is especially true in making shoes, where such results are of special value. These results are brought about by providing a material which is partially vulcanized to a permanent consistency for fixing its general character and yet is capable of becoming momentarily sufficiently relenting to be pressed into molded shape for innersoles and the like. The presence of a sufficient amount of hydro-carbon matter (using that term to include the resinous oily tailings, the natural, and artificial harder tarry residuums and asphaltums) in the composition not only permits this relenting of the mass under high heat notwithstanding its vulcanization, but maintains the material unchangeable and prevents its gradual oxidation or deteriorating when exposed in use. It will be understood that a full vulcanization does not take place but only a soft or partial vulcanization, insufficient to render the sheet stiff or interfere with its free flexibility and tough-bending capability without tendency to break.

The extreme workability, pliability, adaptability and strength of my material render it especially serviceable for various uses in the manufacture of shoes, but particularly for innersoles, as mentioned; and to make this point still clearer I would explain that each shoe manufacturer commonly has his own individual shapes and styles of shoes, and as the peripheral outlines of the stitch-receiving rib of the innersole is what determines the outline shape of the shoe, it will be understood that it is not possible to manufacture channeled innersoles in quantity for general sale, and for the same reason it is impracticable to supply innersole patterns to the trade to suit the various manufacturers. Hence my material and method or process whereby the stitch-receiving rib and channel can be molded by the simple application of a grooved board or die without requiring male and female members or other complicated mechanism, renders my invention of particular service and value for this purpose, as each manufacturer may thereby readily and cheaply make his own innersoles. It not only permits the molding of all varieties and patterns of innersoles at small expense to suit the caprices of the various manufacturers, but it produces absolute uniformity of outline in all the innersoles of any one mold or pattern, thereby eliminating the common inaccuracy of shape or outline now frequently due in part to the workmen in cutting and shaping the lips and in part to the varying initial qualities as to stretching of the leather stock.

I do not herein claim the particular forms of innersoles nor the apparatus, but reserve them for separate applications, as I intend the present application and my co-pending divisional application to be foundational and cover my invention broadly as to the process and product or material (the divisional case containing the process claims).

For economy and efficiency on account of its porosity and puffy nature, I use pulp-like filler material which is also the cheapest, but it will be understood that any partially vulcanizable mass, including rubber and its substitutes, and reclaimed varieties, if provided with a sufficient amount of preferably hydro-carbon matter to undermine by heat the permanent consistency and toughness of the mass, will be rendered impressionable and capable of treatment as described, and will come within certain of my claims hereinafter set forth. But in addition to the fact of cheapness, mentioned, the composition which I have laid most stress upon above, is preferable because it does not draw or heat the foot, as a rubber compound would. Moreover its porosity aids materially in molding the innersole, permeating the fabric layers, etc. Also certain features of my invention can be carried out without employing vulcanization, as, for example, in such substances as linoleum, I have found that by slight changes it is possible to render the cork and oxidized oil composition impressionable under heat, as described. Again, some compositions, as gutta-percha admixed with fibrous filler, can be molded cold, under high pressure. And, finally, the article may be molded to its final shape when first made, instead of first being sheeted, etc., reheated and molded. Of course, if the vulcanization is omitted, the vulcanizing ingredients of the compound will preferably be omitted also, the remaining ingredients of the compound having the fluxing or softening capacity in the presence of heat to permit the preliminary saturating and mixing action to take place within the compound and to permit the subsequent incorporation of the compound into the duck or other textile layer so as to interlock and mechanically grip the strands and fibers thereof. The degree of heat, in such instance, would be merely sufficient to provide proper working conditions. I intend also to include as coming within my invention the provision of the moldable and molded composition, whether with or without the fabric layer or layers, as the stitch-receiving surface strength may be provided in other ways, and when cloth is used it may be cemented or otherwise applied to the molded body as in the usual process of making gem innersoles. I mention all these variations from my preferred procedure to make clear the broad scope of my invention, but all these are inferior for various reasons to the method and article which I have explained at length above.

Having described my invention, what I claim as new and desire to secure by Letters Patent, is, 1. The herein described article, consisting of a fabric sheet, having an outside layer of heavy canvas, a body-backing having its surface incorporated into said canvas and containing comminuted pulp-like filler material and penetrating tarry ingredients, the whole being fluxed together by heat into a tough, waterproof, strongly flexible, leather-like sheet.

2. The herein described article, consisting of a fabric sheet, having an outside layer of heavy canvas, a body-backing having its surface incorporated into said canvas and containing comminuted pulp-like filler material and penetrating tarry ingredients, the whole being fluxed together by heat and pressure into a tough, waterproof, strongly flexible, leather-like sheet.

3. The herein described article, consisting of a fabric sheet, having an outside layer of heavy canvas provided with an outstanding stitch-receiving rib formed integrally from said canvas, a body-backing having its surface incorporated into said canvas and containing comminuted pulp-like filler material and penetrating tarry ingredients, the whole being fluxed together by heat and pressure into a tough, waterproof, strongly flexible, leather-like sheet.

4. The herein described article, consisting of a firm, strongly flexible, waterproof, pliable, leather-like sheet, composed of opposite layers of textile material, and an intervening body composed of pulp-like filler material permeated with low-melting, penetrating hydro-carbon, the whole being incorporated together by heat and pressure into mutually permeating interlocked relation.

5. The herein described article, consisting of a porous, firm, strongly flexible, waterproof, pliable, leather-like sheet, composed of opposite layers of textile material, and an intervening body composed of pulp-like filler material permeated with low-melting, penetrating hydro-carbon, the whole being incorporated together by heat and pressure into mutually permeating interlocked relation.

6. The herein described article, consisting of a firm, strongly flexible, waterproof, pliable, leather-like sheet, composed of opposite layers of textile material, and an intervening body composed of pulp-like filler material permeated with low-melting, penetrating hydro-carbon, and hard and tough mineral tars, the whole being incorporated together by heat and pressure into mutually permeating interlocked relation.

7. The herein described article, consisting of a fabric sheet, composed of pulp-like filler material permeated with low-melting, penetrating hydro-carbon, and hard and tough mineral tars, incorporated together by heat and pressure into a firm, strongly flexible, waterproof, pliable, leather-like sheet.

8. The herein described article, comprising a light, porous, waterproof, tough sheet having a cloth outer layer united therewith by having the surface portion of said sheet incorporated into interlocked and permeating engagement with the strands and fibers thereof, said article relenting to a soft condition under the influence of heat under 275 degrees F. without permanent injury to its structural strength and setting instantly to molded shape upon being cooled.

9. The herein described article, consisting of a fabric sheet, having an outside layer of heavy canvas, and body-backing incorporated into said canvas and containing comminuted pulp-like filler material and penetrating tarry ingredients, the whole being vulcanized together into a tough, waterproof, strongly flexible, leather-like sheet.

10. The herein described article, consisting of a fabric sheet, composed of pulp-like filler material permeated with low-melting, vulcanizable, penetrating hydro-carbon, and vulcanizing ingredients, vulcanized together into a firm, strongly flexible, waterproof, pliable, leather-like sheet.

11. The herein described article, consisting of a fabric sheet, composed of pulp-like filler material permeated with low-melting, vulcanizable, penetrating hydro-carbon, and vulcanizing ingredients, vulcanized together into a porous, firm, strongly flexible, waterproof, pliable, leather-like sheet.

12. The herein described article, consisting of a fabric sheet, composed of pulp-like filler material permeated with low-melting, vulcanizable, penetrating hydro-carbon, hard and tough mineral tars, and vulcanizing ingredients, vulcanized together into a firm, strongly flexible, waterproof, pliable, leather-like sheet.

13. The herein described article, comprising a composition of comminuted filler material of the kind mentioned, vulcanizing agents, and means for rendering the mass after vulcanization capable of softening without injury to its structural strength, all vulcanized together into a tough, waterproof, pliable, strongly flexible, leather-like condition.

14. The herein described article, comprising a vulcanized composition of comminuted filler material of the kind mentioned, vulcanizing agents, and means for rendering the mass capable of softening without injury to its structural strength, said composition being condensed in sheet form with an outside strong, tough, non-stretchable layer.

15. The herein described article, comprising a layer of strong textile material, and a backing of vulcanized pulp vulcanized thereto.

16. The herein described article, comprising a light, porous, waterproof, tough, vulcanized sheet having a cloth outer layer vulcanized thereto, said article relenting to a soft condition under the influence of heat under 275 degrees F. without permanent injury to its structural strength and setting instantly to molded shape upon being cooled.

17. The herein described article, consisting of a porous, waterproof, pliable, tough sheet containing a low-melting, sticky penetrating hydro-carbon.

18. The herein described article, consisting of a porous, waterproof, pliable, tough sheet containing a low-melting, sticky, penetrating hydro-carbon and a hard tarry residuum.

19. The herein described article, consisting of a porous, waterproof, pliable, tough sheet containing a low-melting, sticky, penetrating hydro-carbon, and a tough, non-penetrating hydro-carbon.

20. The herein described article, consisting of a light, waterproof, pliable, tough sheet capable of becoming moldably plastic at a temperature under 275 degrees Fahrenheit, and a facing layer of heavy stitch receiving fabric, the two being vulcanized together into a strongly flexible sheet.

21. The herein described article, having its ingredients vulcanized together into a uniform, pliable, strongly flexible sheet, and containing constituents rendering the vulcanized sheet moldable under the influence of high heat to permanent local configuration while yet retaining its structural nature and strength.

22. The herein described article, consisting of a sheet of tough, waterproof, pliable material having a top layer of strong canvas vulcanized thereto, said canvas side of said sheet having a molded stitch-retaining rib projecting therefrom, and the opposite side of said sheet being flat.

23. The herein described article, comprising a vulcanized sheet of composition subservient to heat rendering the sheet locally plastic and moldable without destroying its structural nature and strength.

24. The herein described article, comprising a vulcanized sheet consisting of a surface layer of heavy canvas and a body layer of composition subservient to heat to render the sheet locally moldable without destroying its structural nature and strength.

25. The herein described article, comprising a vulcanized sheet consisting of two outside fabric layers and an intermediate layer of composition subservient to heat to render the sheet locally moldable without destroying its structural nature and strength.

26. The herein described article, consisting of a sheet of light, porous, pliable, flexible composition, having a projecting stitch-receiving rib molded therefrom on one side, the opposite side of said sheet being flat.

27. The herein described article, consisting of a sheet of light, porous, pliable, flexible composition, capable of becoming plastic and moldable under heat, having a projecting stitch-receiving rib molded therefrom on one side, the opposite side of said sheet being flat.

28. The herein described article, consisting of a unitary sheet comprising a surface layer of heavy canvas and a body of light, porous, pliable and flexible composition capable of becoming plastic and moldable under high heat insufficient to injure the canvas, having a projecting stitch-receiving rib molded therefrom on the canvas side of the sheet, the opposite side of the sheet being flat.

29. The herein described article, consisting of a unitary sheet comprising opposite surface layers of textile fabric and an intermediate body of light, porous, pliable and flexible composition capable of becoming plastic and moldable under high heat insufficient to injure the textile fabric, having a projecting stitch-receiving rib molded therefrom on one side of the sheet, the opposite side of the sheet being flat.

30. The herein described article, consisting of a vulcanized sheet of composition, having a projecting stitch-receiving rib molded therefrom on one side, the opposite side of said sheet being flat.

31. The herein described article, consisting of a vulcanized sheet comprising a surface layer of heavy canvas and a body layer of composition, having a projecting stitch-receiving rib molded therefrom on the canvas side of the sheet, the opposite side of the sheet being flat.

32. The herein described article, consisting of a vulcanized sheet comprising two outside fabric layers and an intermediate layer of composition subservient to heat to render the sheet locally moldable without destroying its structural nature and strength, and having a projecting stitch-receiving rib molded therefrom on one side, the opposite side of said sheet being flat.

33. The herein described article, having an internal layer of composition, a plane sheet backing on one side, and a strong textile layer such as canvas on the other side provided with a projecting stitch-receiving rib, united together immovably by said composition.

34. The herein described article, having an internal layer of composition, a plane sheet backing on one side, and a strong textile layer such as canvas on the other side provided with a projecting stitch-receiving rib, united together by being incorporated into each other in mutually binding and interlocked relation.

35. The herein described article, comprising a layer of strong textile material, a composition body-layer, and a flat backing, united in the order named, said textile layer having separated projecting stitch-receiving ribs extending longitudinally of the article adjacent the opposite edges thereof, and having its intervening area between said ribs held in a permanently stretched condition by its union with said composition layer.

36. The herein described article, comprising a layer of strong textile material, a composition body-layer, and a flat backing, united in the order named, said textile layer having separated projecting stitch-receiving ribs extending longitudinally of the article adjacent the opposite edges thereof, and having its ribs and the intervening area between said ribs held in a permanently stretched condition by its union with said composition layer.

37. The herein described article, consisting of a fabric sheet, having an outside layer of heavy canvas containing a projecting stitch-receiving rib formed therein, and a composition body-backing containing fibrous material and moldable, permeating ingredients incorporated into said canvas and mechanically gripping and retaining the said outside layer and its rib immovably in place.

38. The herein described article, consisting of a fabric sheet, having an outside layer of heavy canvas containing a projecting stitch-receiving rib formed therein, and body-backing incorporated by pressure into said canvas and containing fibrous material and penetrating hydro-carbon, the whole being firm, flexible, and non-stretchable.

39. The herein described article, consisting of a fabric sheet, having an outside layer of heavy canvas containing a projecting stitch-receiving rib formed therein, and body-backing incorporated by pressure into said canvas and containing fibrous material and penetrating hydro-carbon, the whole being firm, flexible, waterproof, and non-stretchable.

40. The herein described article, consisting of a unitary sheet comprising a surface layer of heavy canvas and a body of light, and flexible composition capable of becoming plastic and moldable under high heat insufficient to injure the canvas, having a stitch-receiving rib of the canvas projecting therefrom on the canvas side of the sheet, the opposite side of the sheet being flat, and the whole united together by the composition incorporated into the canvas.

In testimony whereof, I have signed my name to this specification, in the presence of two subscribing witnesses.

ANDREW THOMA.

Witnesses:
 Geo. H. Maxwell,
 Wm. J. Pike.